No. 855,852. PATENTED JUNE 4, 1907.
E. T. HAUN.
ROTARY ENGINE.
APPLICATION FILED DEC. 24, 1906.

2 SHEETS—SHEET 1.

WITNESSES:

INVENTOR
Edgar T. Haun
BY Geo. H. Strong.
ATTORNEY

No. 855,852. PATENTED JUNE 4, 1907.
E. T. HAUN.
ROTARY ENGINE.
APPLICATION FILED DEC. 24, 1906.
2 SHEETS—SHEET 2.
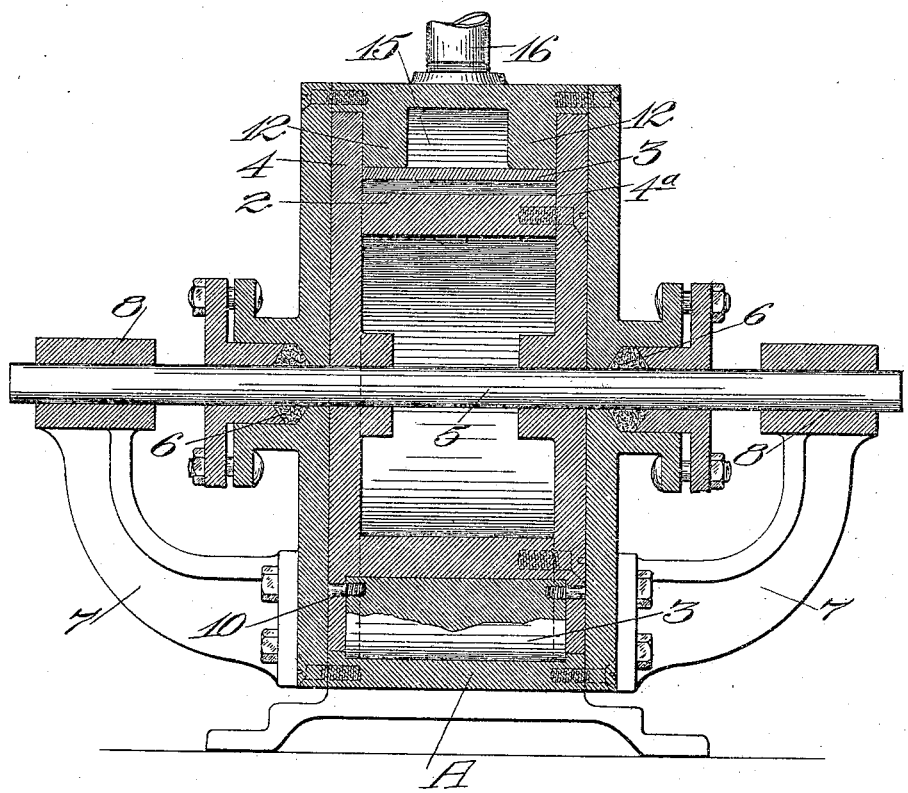
WITNESSES:
INVENTOR
Edgar T. Haun.
BY
Geo. H. Strong.
ATTORNEY

UNITED STATES PATENT OFFICE.

EDGAR T. HAUN, OF SACRAMENTO, CALIFORNIA.

ROTARY ENGINE.

No. 855,852.  Specification of Letters Patent.  Patented June 4, 1907.

Application filed December 24, 1906. Serial No. 349,279.

*To all whom it may concern:*

Be it known that I, EDGAR T. HAUN, a citizen of the United States, residing at Sacramento, in the county of Sacramento and State of California, have invented new and useful Improvements in Rotary Engines, of which the following is a specification.

My invention relates to a fluid motor or turbine.

It consists in the combination of parts, and in details of construction which will be more fully explained by reference to the accompanying drawings, in which—

Figure 1:
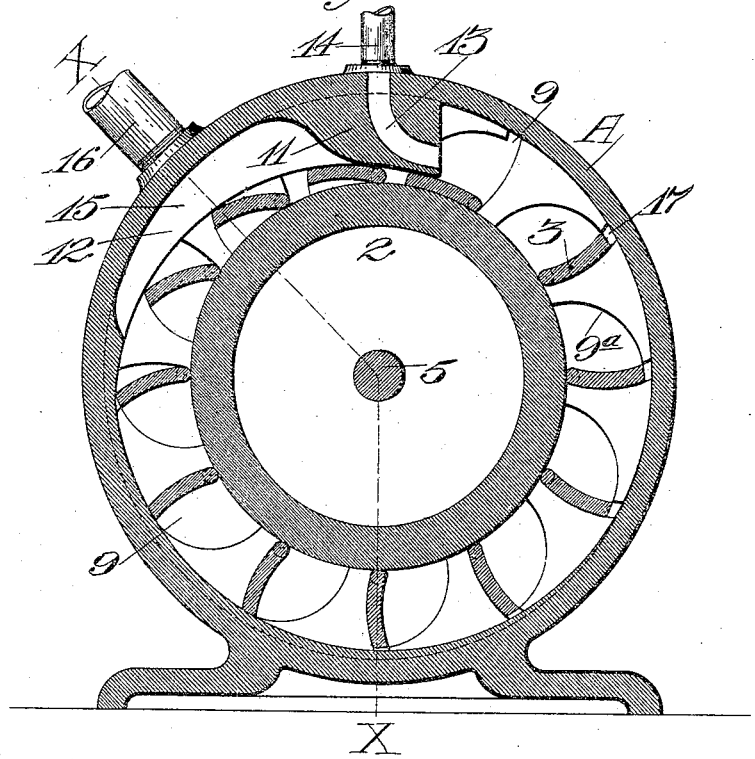
Figure 2:
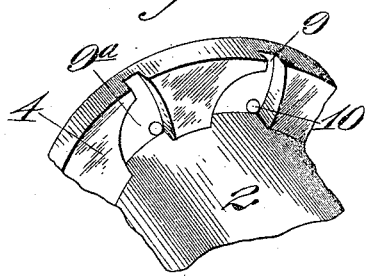

Figure 1 is a longitudinal section through my turbine. Fig. 2 is a perspective showing the radial grooves or channels of the disks. Fig. 3 is a section on line x—x of Fig. 1.

It is the object of my invention to provide a rotary mechanism to be impelled by a fluid under pressure.

The device comprises an outer circular casing A within which is fitted and revoluble, an annular section 2 to which the blades or buckets 3 are foldably connected as will be hereafter more fully described. The annular portion 2 is preferably cast with one disk-shaped end 4 formed with it, and the other end $4^a$ is bolted or screwed upon the opposite end of the disk 2 so as to form a structure composed of the annular central ring and the end disks 4—$4^a$. This structure is mounted upon a shaft 5 which passes out through the ends forming the outer casing, and through stuffing-boxes as at 6 which prevent leakage. In order to steady and support this shaft, I prefer to employ brackets 7 which are bolted upon each end of the case, and carry boxes 8 at a sufficient distance outside of or beyond the stuffing-boxes 6 to insure a steadiness in the running of the shaft, and to prevent any undue strain thereon.

The inner faces of the disks 4—$4^a$ have radial grooves or channels made in their inner sides at regular intervals as shown at 9. The front edges of these grooves are approximately radial to the structure, and the rear edges are curved in the form of quadrants as shown at $9^a$; these quadrant sides commencing on the periphery with the opening 9, thence curving inwardly and outwardly to form the widest space at the central portion or drum 2. At the junction and forward angle of these channels, and in proximity with the drum 2 are made holes or openings 10. The buckets or blades 3 have corresponding holes made in their inner ends, and these are in alinement with the holes 10 and are secured by screw-pins passing through holes 10 and into the edges of the buckets, so that the buckets may turn about these pins to either lie upon the periphery of the drum 2, with the curvature of which they are preferably made to coincide, or to stand up and fill the space between the rim 2, and the outer casing A.

11 shows an abutment which extends from the outer casing to a point near the periphery of 2, but leaving space enough between the inner edge of the abutment and said periphery to allow the buckets 3 to pass through the said space during the revolution of the drum which carries the buckets, and while the buckets are folded down upon the face of the drum. The buckets are folded down in this manner by means of a track or guide 12 upon each end of the case, and with which the opposite ends of the buckets, extending across the interior of the case contact when they reach a certain point. This curve commencing at the inner periphery of the outer case gradually moves inward until it coincides with the inner edge of the abutment 11, so that the outer edges of the buckets engaging with this curved guide 12, will be gradually drawn down into a position substantially fitting upon the surface of the drum 2, in which position they pass beneath the abutment. After passing the abutment, centrifugal force will cause the outer edges of the buckets to be extended within the casing A.

Through the abutment is made a passage or opening 13 with which passage is connected a pipe 14 for the admission of the impelling fluid under pressure. This impelling fluid may be here described as an elastic fluid, such as compressed air or steam, and its pressure acting upon the inner faces of the buckets 3, causes them to be impelled around the channel formed between the drum 2 in the outer casing. The point contiguous to the commencement of the curved guide 12 which folds the buckets downwardly is an enlarged chamber 15, and this has connected with it an exhaust passage 16 so that when the buckets have passed the commencement of the chamber 15, the impelling fluid will be allowed to escape through this chamber and through the passage 16. As each bucket arrives at this point, and is gradually folded down upon the drum 2, by the action of the guides 12, it will be seen that the elastic fluid will be allowed to escape, and when the buckets have been fully folded down, there will only be sufficient space for them to pass beneath the abutment 11. In order to allow the medium under pressure to act upon successive buckets I have shown the drum 2 as slightly eccentric to the interior of the outer casing A so that when the first bucket 3 is extended within the casing, it does not reach to the inner periphery of said casing, but leaves a space along its outer edge, as shown at 17, and through this space the elastic fluid passes in proportion to the size of the space, and acts upon the second bucket 3 in advance of the first one. By reason of the eccentricity of the bucket-carriers it will be manifest that these spaces become gradually less until upon the side to which the axis of the drum is nearest the buckets will substantially fit within the casing A for the last remaining portion of their revolution, before they arrive at the exhaust chamber 15. This construction enables me to apply the pressure of the propelling medium to a series of the buckets in constantly reduced force as the buckets recede from the admission port; but sufficient to greatly increase the power of the apparatus.

Having thus described my invention, what I claim and desire to secure by Letters Patent is—

1. In a motor, a cylindrical casing, a drum journaled within said casing having disk-like flanges at each side, quadrant shaped depressions made at intervals in the disks, buckets pivoted at the center of curvature of the quadrants and turnable therein, and curved guides engaging the peripheral edges of the buckets during their revolution whereby the buckets are folded down upon the drum.

2. In a motor, a circular casing, a drum journaled within the casing having flanges at each end with quadrant-shaped depressions, buckets having pivots at the center of curvature of the quadrants about which said buckets are turnable, substantially radial front walls against which the buckets are arrested when projected, an abutment, and converging guides by which the buckets are folded to pass beneath the abutment.

3. In a motor, an outer casing, a drum having disks at the ends with depressed quadrant-shaped channels around their peripheries and turnable within the casing, buckets pivoted in the channels and capable of extension around their pivot points, an abutment extending from the casing to a point contiguous to the periphery of the drum, and thereby forming a space through which the buckets may pass when folded upon the drum, fixed guides adapted to engage the outer edges of the buckets, said guides curving inwardly and substantially continuous with the inner face of the abutment.

4. In an apparatus of the character described, an exterior circular casing, an interior drum carrying buckets which are extensible, to be impelled by a medium under pressure and foldable to pass an abutment, said drum being journaled eccentrically within the casing whereby open passages for the impelling medium are left between the casing and the bucket edges upon one side, said passages gradually closing upon the opposite side.

5. In an apparatus of the character described, an exterior casing having an abutment, and an inlet passage through one side of the abutment, an exhaust chamber at the opposite side of the abutment, a drum journaled eccentrically within the casing and having disk like flanges at the ends with quadrant shaped depressions, buckets pivoted in said chambers, and means by which they are folded upon the drum to pass beneath the abutment and extensible radially within the space between the casing and drum after passing the abutment, said eccentricity of the drum being so disposed as to allow the impelling fluid to pass the buckets contiguous to the admission passage, and to substantially close said spaces upon the opposite side of the apparatus, and an exhaust chamber through which the buckets pass at the rear of the abutment.

In testimony whereof I have hereunto set my hand in presence of two subscribing witnesses.

EDGAR T. HAUN.

Witnesses:
CHAUNCEY H. DUNN,
IDA B. STOCKER.